No. 789,051. PATENTED MAY 2, 1905.
O. M. MOWAT.
CHUCK.
APPLICATION FILED APR. 19, 1904.
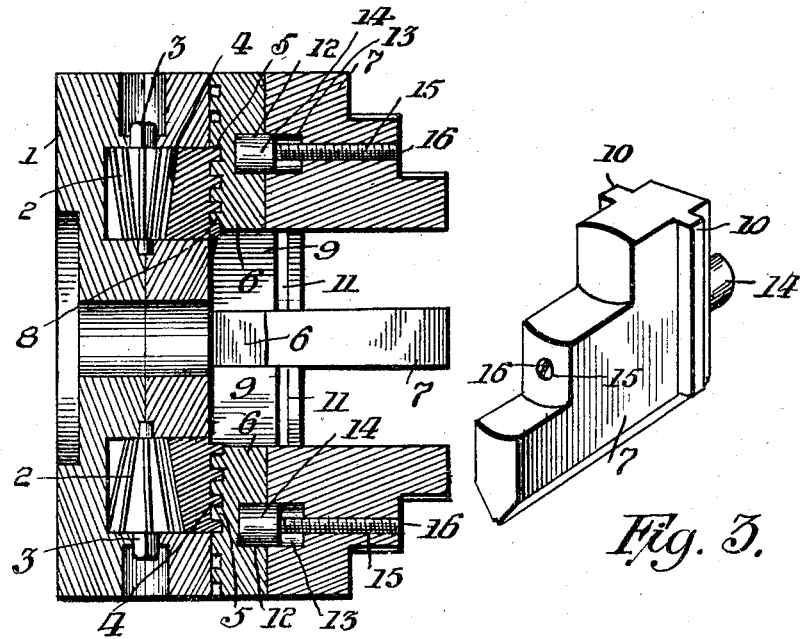
Fig. 1.
Fig. 3.
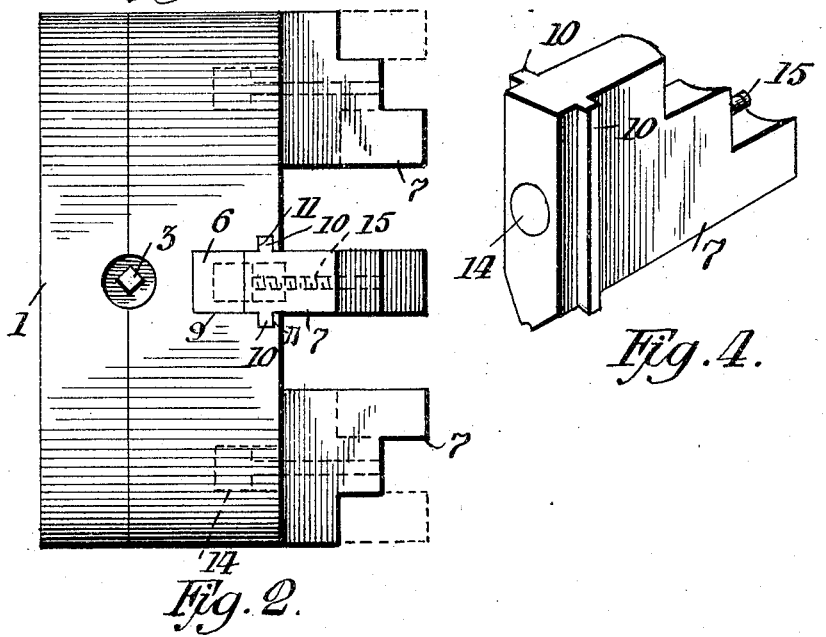
Fig. 2.
Fig. 4.
Witnesses:
K. H. Butler
E. E. Potter
Inventor
O. M. Mowat,
By N. C. Evert & Co.
Attorneys.

No. 789,051.   Patented May 2, 1905.

UNITED STATES PATENT OFFICE.

OLIVER M. MOWAT, OF McKEESPORT, PENNSYLVANIA.

CHUCK.

SPECIFICATION forming part of Letters Patent No. 789,051, dated May 2, 1905.

Application filed April 19, 1904. Serial No. 203,873.

*To all whom it may concern:*

Be it known that I, OLIVER M. MOWAT, a citizen of the United States of America, residing at McKeesport, in the county of Allegheny and State of Pennsylvania, have invented certain new and useful Improvements in Chucks, of which the following is a specification, reference being had therein to the accompanying drawings.

This invention has relation to chucks, and has for its object the provision of a chuck of novel form having reversible jaws. In reversible-jaw chucks of the ordinary character, in which the jaws are moved toward and from the center of the chuck by means of a revolving scroll which meshes with teeth on the back of the jaws, two sets of jaws are employed, and it is necessary when the jaws are to be changed to remove all of the jaws by turning the scroll until the teeth on the back of the same are out of engagement with the scroll and then replace the jaws which have been removed by another set. The additional set of jaws required in this form of chuck adds to the expense of the chuck, and the jaws being used alternately that set which is out of use is liable to become mislaid or lost.

Various expedients have heretofore been adopted for reversing the jaws of a chuck so that the one set of jaws will serve for inside and outside jaws; but the expedients adopted for this purpose have in most cases proved unsatisfactory, being either too complicated or the means for securing the jaws in their alternative positions being liable to be rendered inoperative by the rough usage to which chucks are usually subjected.

In carrying my invention into effect I provide a scroll or other form of chuck with two-part jaws, one part of which is formed with teeth that engage with the scroll or other jaw-actuating means and the other part of which is formed with steps of the usual configuration.

The two-part jaws in my improved chuck are separable, so that the part upon which the steps are formed and which constitutes that part of the chuck which engages with and holds the material being operated on is removable and reversible, while the part which has the teeth upon its back and which engages with the scroll or other means for actuating the jaws is allowed to remain in position in the body of the chuck, and I provide means for firmly securing the parts of the chuck-jaws together in either position of the removable part, this means consisting of screw-threaded bolts that pass through the stepped jaws and into the parts that mesh with the scroll or similar part and lock them in position relatively one to the other, while allowing them to be jointly moved by means of the scroll or other actuating means.

Referring to the accompanying drawings, in which I have shown a chuck constructed according to my improvements, Figure 1 is a vertical longitudinal sectional view of the complete chuck. Fig. 2 is a plan view of the same. Fig. 3 is a perspective view with part of one of the reversible jaws looking at the front end thereof, and Fig. 4 is a similar view of the same looking at the rear end thereof.

1 designates the body of the chuck, within which are journaled the tapered pinions 2 2, which are provided with the square heads 3 3 for the reception of a key, by means of which the pinions are turned, the said pinions meshing with a circular rack 4 on the back of a scroll 5, all these parts being of the usual or of any desired construction, it being only essential that the chuck be provided with a revoluble scroll and means for revolving the same.

The jaws of my improved chuck, of which there may be any desired number, are composed of the two parts 6 and 7, the part 6 of each jaw having teeth 8 on its back, which mesh with the thread on the scroll 5. The two parts 6 and 7 of each jaw are fitted and slide in a radial slot 9 in the body of the chuck, and the reversible part 7 of each jaw is formed with ribs 10 10, which fit in grooves 11 11 at the sides of the radial slot 9. The parts 6 and 7 of the jaws are formed with coinciding recesses 12 and 13, which may be of circular or any other form, and in these recesses is fitted a head 14, carried by a bolt 15, the said bolt passing through a screw-threaded hole in the part 7, which hole extends from the face of the second step of the part 7 to the recess 13, the outer end of the bolt when the parts 6 and 7 are secured together being flush with or slightly within the end of the hole and the said bolt being provided on its outer end with a notch 16 to receive the point of a screw-driver.

The parts being constructed as above described are operated in the following manner: In the drawings the reversible parts 7 of the jaws are shown in the position they occupy when used as inside jaws, the steps being in this position on the inside. The head 14 of the bolt 15 in this position is at such a point in the recesses 12 and 13 that it overlaps the joint between the parts 6 and 7 and maintains them in a fixed position relatively one to the other. While the parts 6 and 7 of the jaws are secured together relatively one to the other by the head 14, the jaws as a whole can be moved inwardly and outwardly by rotating the pinion 2. When it is desired to reverse the jaws, the bolt 15 of each jaw is turned, by means of a screw-driver or other appropriate tool, until the head 14 is drawn into the recess 13 such distance that it will be entirely out of the recess 12, whereupon the parts 7 of the several jaws are drawn out of the slots 9, reversed in position, and replaced. The bolts 15 are then screwed in and the heads 14 projected partly into the recess 12 to the position shown in Fig. 1, the parts 6 and 7 being thereby again locked together.

It will be observed that in my improved chuck it is only necessary to remove the outer part 7 of the jaws, the inner part 6 remaining always in mesh with the scroll, and by this construction and arrangement of parts it is not necessary to replace the reversible parts 7 in the same slot from which each has been taken, the parts 7 being interchangeable, whereby the loss of time entailed in selecting the particular jaw that fits the particular groove in the chucks of the ordinary construction is avoided.

While I have described the bolts 15 as carrying heads 14, such heads are only necessary to avoid making the body of the bolts too large, and it is obvious that if the recesses 12 and 13 are of the same diameter as the bolt the heads 14 may be dispensed with, the head being employed merely to give greater strength and to avoid using bolts of unnecessarily large size.

It will of course be understood that my improvements are applicable not only to scroll-chucks, but to any form of chuck in which radially-disposed jaws are actuated by mechanism contained within the chuck—for instance, to chucks wherein the jaws are independently moved by screws.

Having described my invention, I claim—

1. In a chuck, the combination with a body portion having radial slots, of two-part jaws, one part of each jaw resting entirely within one of said slots, the other part of each jaw resting partly within the slot and having lateral ribs engaging grooves in the sides of the slots, means for connecting and disconnecting the two parts of each jaw while both remain in the slot, and means for moving the jaws in the slots.

2. In a chuck, the combination with a chuck-body, a scroll and means for rotating the scroll, of a plurality of two-part jaws, the two parts of each jaw being formed with coinciding recesses, a bolt fitting said recess and movable from the exterior of the jaw, said bolt having a smooth inner end and being screw-threaded on its outer end and screwing into the outer section of the jaw, and the said outer section of the jaw being formed with lateral ribs fitting grooves in the sides of the radial slot in which the jaw is located.

3. The combination with a chuck-body having radial slots, of chuck-jaws working in said slots and composed of two parts, one part fitting entirely within the slot, the other part fitting partly within the slot and having ribs on its sides fitting grooves in the sides of the slots, the two parts of each jaw having flat abutting surfaces and coinciding recesses, with a bolt having a head fitting said recesses and adapted to be drawn entirely within the recess in one jaw to permit of the two parts of the jaw sliding one upon the other.

4. In a chuck, the combination with a chuck-body having radial slots and grooves at the sides of said slots, of two-part jaws, the two parts of each jaw both fitting one of said slots, the outer part having ribs fitting in said grooves, the two parts of each jaw having coinciding recesses and bolts screwed through threaded holes in the outer jaw and having heads fitting the said coinciding recesses and adapted to be drawn entirely within the recess in the outer jaw.

In testimony whereof I affix my signature in the presence of two witnesses.

OLIVER M. MOWAT.

Witnesses:
H. C. EVERT,
E. E. POTTER.